United States Patent [19]

Slovak et al.

[11] Patent Number: 5,143,601
[45] Date of Patent: Sep. 1, 1992

[54] FLUID PURIFICATION SYSTEM

[75] Inventors: Jack P. Slovak; Robert A. Slovak, both of Reno, Nev.

[73] Assignee: Water Factory Corporation, Irvine, Calif.

[21] Appl. No.: 418,093

[22] Filed: Oct. 6, 1989

[51] Int. Cl.⁵ .......................................... B01D 61/08
[52] U.S. Cl. ................... 210/90; 210/96.2; 210/232; 210/259
[58] Field of Search ............... 210/340, 341, 90, 232, 210/96.2, 195.2, 258, 259, 282

[56] References Cited

U.S. PATENT DOCUMENTS

| | | | |
|---|---|---|---|
| 1,861,576 | 6/1932 | Liddell | 210/DIG. 17 X |
| 1,942,584 | 1/1934 | Weinstein | 210/132 |
| 2,548,400 | 4/1951 | Shepard | 210/184 |
| 3,746,171 | 7/1973 | Thomson | 210/234 |
| 3,931,011 | 1/1976 | Richards et al. | 210/136 |
| 3,950,251 | 3/1976 | Hiller | 210/232 |
| 4,192,750 | 3/1980 | Elfes et al. | 210/133 |
| 4,251,374 | 2/1981 | Cunningham | 210/232 |
| 4,268,384 | 5/1981 | Rosaen | 210/133 |
| 4,361,485 | 11/1982 | Boonstra | 210/636 |
| 4,526,688 | 7/1985 | Schmidt, Jr. et al. | 210/457 X |
| 4,547,289 | 10/1985 | Okano et al. | 210/652 |
| 4,552,662 | 11/1985 | Webster et al. | 210/232 |
| 4,623,467 | 11/1986 | Hamlin | 210/652 |
| 4,637,874 | 1/1987 | Ansteth | 210/232 |
| 4,645,601 | 2/1987 | Reguathan et al. | 210/4.38 X |
| 4,713,175 | 12/1987 | Bray | 210/321.83 X |
| 4,735,716 | 4/1988 | Petrucci et al. | 210/232 |
| 4,780,200 | 11/1988 | Bond et al. | 210/194 |
| 4,784,763 | 11/1988 | Hambleton et al. | 210/90 |
| 4,786,420 | 11/1988 | Dalessandro | 210/791 |

*Primary Examiner*—Frank Spear
*Attorney, Agent, or Firm*—Willian Brinks Olds Hofer Gilson & Lione

[57] ABSTRACT

A fluid treatment system is provided which includes a fluid distribution manifold, a multiport connector including a plurality of fluid channels, and at least one discrete fluid treatment cartridge. The distribution manifold includes a plurality of fluid channels, one for each of a plurality of fluid connection tubes with the fluid channels having inlet and outlet ports. The multiport connector is configured such that each one of the fluid channels in the multiport connector aligns with one of the ports in the distribution manifold. The fluid treatment cartridge includes a sump which includes a fluid inlet port and a fluid outlet port. The sump is configured such that the cartridge fluid inlet port aligns with one of the ports in the distribution manifold and the cartridge outlet port aligns with another the ports in the distribution manifold. A replacement treatment cartridge is also provided for a distribution manifold which includes a cartridge receiving aperture. The replacement filter cartridge includes a post adapted to be received in the cartridge receiving aperture. The post is adapted to be affixed to the distribution manifold.

26 Claims, 5 Drawing Sheets

FLUID PURIFICATION SYSTEM

BACKGROUND OF THE INVENTION

The present invention relates generally to a fluid purification system and more particularly to a fluid purification system which does not use fittings and therefore is more reliable against leaks. The present invention also relates to a fluid purification system to which control and monitoring devices may be easily attached.

A number of water purification systems which are intended for commercial and household use are presently available. Available household systems include both under-the-counter as well as counter-top units. Such available systems typically include a number of water treatment filters or filter elements such as prefilters, ultraviolet water treatment devices, reverse osmosis membrane filters and postfilters through which feedwater is processed. Although such available systems provide an adequate filtration system, they are typically unsightly, and bulky, and difficult to install and remove. Such filter units typically include a number of fittings which are used to connect the filtration system to various external water processing or holding components through a number of tubes. Further, in most available systems, replacement of the individual filters require a fair amount of labor to remove and install a new filter.

In presently available systems, external devices such as control or monitoring devices are generally not integrated into the system and therefore are more difficult to attach. Further, available fluid treatment systems were not designed to incorporate additional devices and therefore do not possess the aesthetic qualities of the present invention.

For example, one known water filter systems is disclosed in U.S. Pat. No. 1,942,584 (Weinstein). The filter disclosed in this reference includes a one-piece casing having a plurality of partitions which divide the casing into a plurality of compartments. Each of the compartments is used as a housing for various filtering means. The system includes a number of tubes connected to the casing for transferring fluid from one compartment to another compartment. Separate external tubes are provided for functions such as bypassing a particular filter. The system also includes a plug at the bottom of each compartment which may be used to conduct water in a direction reverse to its normal flow in order to force accumulation or buildup of materials from the face of the filters. A threaded opening is provided at one end for admitting the fluid into the first filter compartment and a second threaded opening is provided at the opposite end of the casing which functions as an outlet for the filtered fluid.

Other commercially available filter systems, such as the one disclosed in U.S. Pat. No. 4,735,716 (Petrucci et al.), include a permanently installed fluid head to which a plurality of fluid treatment modules or cartridges are attached. These modules may be attached or detached from the head by merely twisting the module or cartridge to disconnect the module or cartridge from the head. The head is typically made of a plastic type material and includes various threaded inlets and outlets to which the tubing from the external components is connected. The external components may include, for example, the feedwater source, the spigot or faucet, a storage tank and a rejection port.

Further, manufacturing the components of the Petrucci et al. system requires the use of relatively expensive and inefficient manufacturing processes. For example, manufacturing the head of the system requires a number of secondary operations, such as machining and/or drilling to open the fluid channels in the head.

Although the last described system provides a single head to which the individual treatment cartridges may be attached and removed from, it is not without disadvantages.

For example, the tubing from the various external components is typically attached to the inlet and outlet by means of a plurality of brass or plastic fittings. Similarly, connections are provided between the bottom of the cartridges for purposes known in the art are also connected by brass fittings.

Such a fitting/head system has several disadvantages. First, there is a movement to eliminate the use of brass fittings to avoid lead contamination that may be caused by the brass material. Further, since the brass fittings are threaded to a plastic cartridge, the plastic to brass fitting connection is prone to leakage problems. Second, the presently available system described above does not provide any means by which additional accessory components may be easily attached. Third, attaching additional components to available system generally requires that the tubing connected to the various cartridges be cut and adapted such that the additional component may be connected at the cut location.

Further, the filter cartridges are attached to the head by means of a plurality of bayonet type clamps which are used to support the sumps of the filter cartridges. Such clamps are disclosed, for example, in the Petrucci et al. patent. Such clamps include a pair of tab receptacles affixed on the head and a complimentary pair of tabs on each of the cartridges which are engageable with one another by one quarter rotation of the cartridge to lock the cartridge to the head. In the available systems which include a plurality of cartridges, the tab receptacles on the head for adjacent cartridges are formed from a single molded member. That is, the receptacles on the cartridge for affixing two adjacent cartridges are comprised of a single plastic member which includes a tab receptacle for one cartridge on one of its sides and a tab receptacle for an adjacent cartridge on an opposing side. Therefore, the tolerances of the cartridges and the head as well as the tab receptacles must be carefully controlled. In this design the tolerances are critical for accurate alignment of the cartridges since the tolerances are cumulative. That is, the tolerances of one of the cartridges as well as the tolerances of the clamp assembly affect the position of all of the succeeding cartridges. Errors in the tolerances from one cartridge will add to the tolerances from another cartridge in a cumulative manner for the entire length of the head. Therefore, the system is more prone to leaks.

In addition to the above-described problems with the fittings, the available filter systems which use fittings attached to the head at a plurality of different locations on the head make the manifold and cartridge system unsightly. This is particularly important in household applications such as under-the-counter and counter-top units.

Therefore in view of the above, it is a primary object of the present invention to provide a fluid treatment system which obviates the need for brass or other metallic fittings to connect the tubing for external sources and components to the unit and is therefore more reliable against leaks.

It is a further object of the present invention to provide a fluid treatment system which is easier to manufacture than existing systems, particularly a system which is easier to manufacture in different shapes which may be required for packaging of the system.

It is a further object of the present invention to provide a fluid treatment unit wherein the tubing connections to external sources and components may be attached to a manifold which provides intercommunication amongst the cartridges by means of a single nonmetallic multiport connector.

It is a further object of the present invention to provide a fluid treatment system wherein accessories such as monitoring and fluid control devices may be easily connected to the fluid treatment system.

It is a further object of the present invention to provide a system wherein the filter cartridges may be easily installed and replaced in the system.

It is still a further object of the present invention to provide a more aesthetic fluid treatment system wherein control and monitoring devices appear as integrated components to the system.

SUMMARY OF THE INVENTION

To achieve the foregoing and other objects and in accordance with the purposes of the present invention, the fluid treatment system of the present invention is intended to be connected to a plurality of external components through a plurality of connection tubes, including a tube for a feed source and a tube for a faucet. The present invention comprises a fluid distribution manifold including a plurality of internal fluid channels, a multiport connector, means for attaching the plurality of connection tubes to the multiport connector, and at least one fluid treatment cartridge. The distribution manifold includes a plurality of internal fluid channels. One end of each of the fluid channels terminates at a first channel port at the outer surface of the distribution manifold and the other end of each of the fluid channels terminating at a second channel port at the surface of the distribution manifold. The multiport connector is configured such that a predetermined one of the fluid channels in the multiport connector aligns with a predetermined one of the first channel ports in the distribution manifold. The fluid treatment cartridge includes a sump section which includes at least one fluid inlet port and at least one fluid outlet port. The sump is configured such that a predetermined one of the fluid inlet ports aligns with a predetermined one of the second channel ports in the distribution manifold and predetermined one of the outlet ports aligns with a predetermined one of the second channel ports in the distribution manifold.

In another aspect of the invention, a replacement treatment cartridge including filter means for filtering a fluid is provided for a attachment to distribution manifold which includes a cartridge receiving aperture, a fluid outlet port and a fluid inlet port. The replacement filter cartridge includes a filter inlet port and a filter outlet port. The replacement filter cartridge further includes a post adapted to be received in the cartridge receiving aperture wherein the post comprises means for affixing the treatment cartridge to the distribution manifold. The replacement cartridge is configured such that the cartridge inlet port aligns with the manifold outlet port when the cartridge outlet port aligns with the manifold inlet port.

Additional objects, advantages and novel features of the invention will be set forth in part in the description which follows, and in part will become apparent to those skilled in the art upon examination of the following or may be learned by practice of the invention. The objects and advantages of the invention may be obtained by means of the combinations pointed out in the appended claims.

DETAILED DESCRIPTION OF THE PRESENTLY PREFERRED EMBODIMENTS

Reference will now be made to the drawings which illustrate preferred embodiments of the invention, wherein like elements are referred to with like reference numerals throughout the various drawings.

Figure 1:
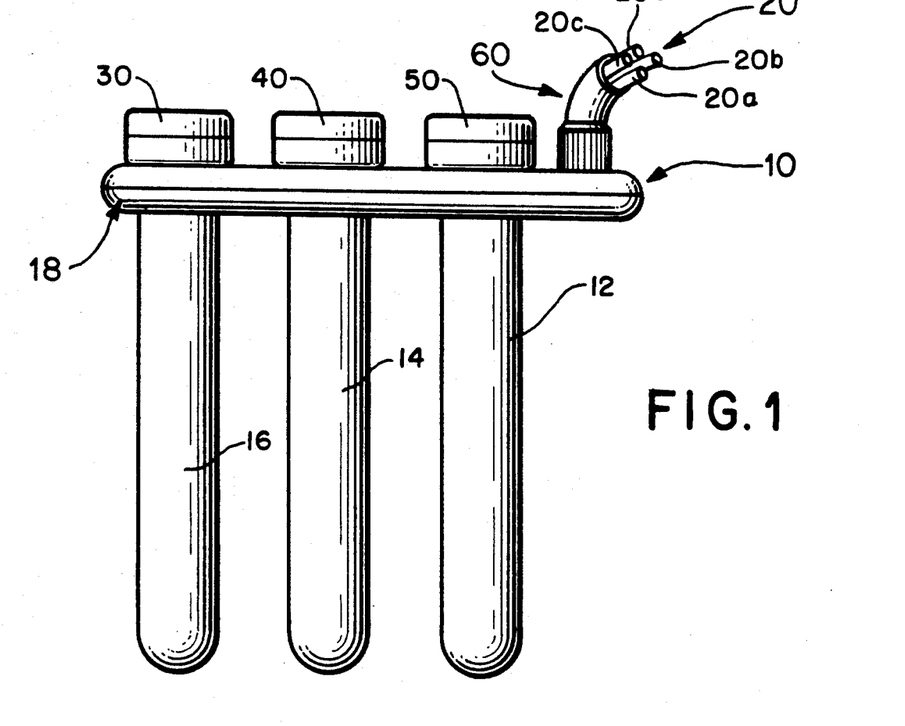
FIG. 1 is a schematic representation of a preferred embodiment of the fluid treatment system of the present invention with a three-head distribution manifold.
Figure 2:
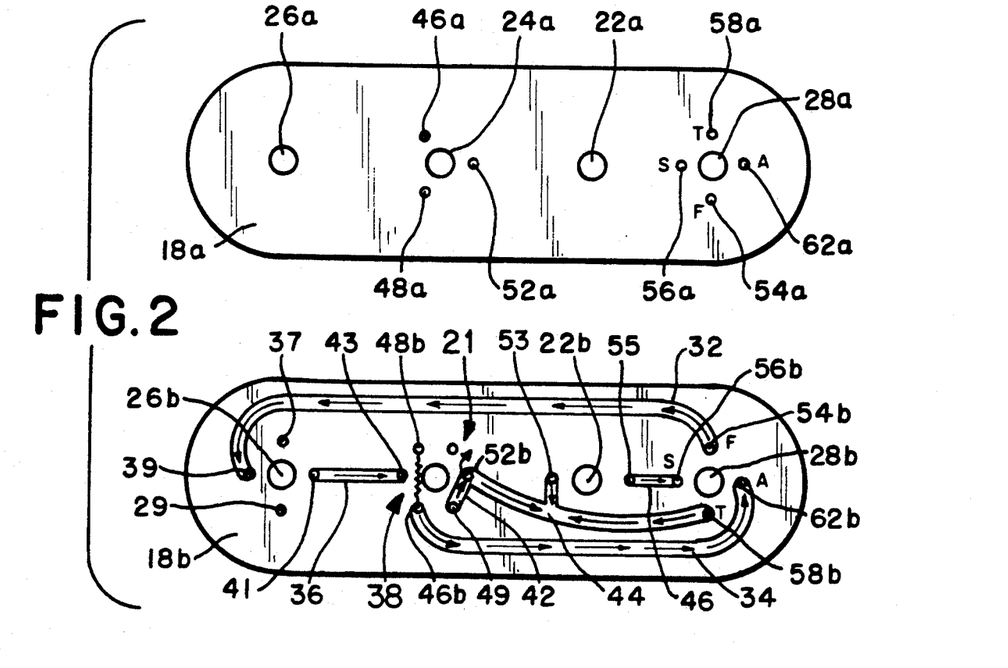
FIG. 2 is a schematic laid open view of a first preferred embodiment of the three-head distribution manifold illustrated in FIG. 1.

Referring now specifically to FIGS. 1 and 2, a first preferred embodiment of the water treatment system 10 is illustrated which includes three filter or treatment cartridges (hereinafter referred to as a three-head system). The system 10 preferably includes a prefilter cartridge 16, a reverse osmosis membrane cartridge 13 and a carbon type postfilter cartridge 12 which are connected in a manner described in more detail below to a three-head distribution manifold 18. The internal structure of the above filter cartridges is known in the art and therefore no further details are given herein.

The filter system 10 includes a plurality of tubes 20 connected at one end to the three-head distribution manifold 18 by means of a single multiport connector 60. The other end of the external component connection tubes 20a-20d may be connected to external components and sources such as the faucet, the feed sources, a storage tank, and a rejection port. As used hereinafter the term "external components" means external components and sources.

A plurality of optional accessory components are preferably connected to the distribution manifold 18. An accessory component is defined herein as a fluid control and/or fluid monitoring device. Such fluid control accessory components may include a flow control device, an automatic shut valve and an automatic electromechanical control device. The monitoring devices may include a percent (%) rejection meter, a conductivity meter and a gallon totalizer with warning devices or shutoff devices. The embodiment illustrated includes an automatic shutoff valve 30, a flow/pressure control module 40 and a percent rejection monitor and/or a specialized filter module 50. The accessory component modules are incorporated into the distribution manifold 18 in a manner described in more detail below.

Now referring specifically to FIG. 2, a top plan view of the bottom section 18b and a bottom plan view of the top section 18a of the distribution manifold 18 are illustrated in laid-open view. As illustrated, the bottom section 18b of the distribution manifold 18 includes all of the conduits or channels which conduct the fluid being treated from the feedwater source through the feedwater connection tube 20b through the various treatment cartridges and modules. The internal conduits are preferably configured to connect the various filter cartridges in series.

The top section 18a of the fluid distribution manifold 18 preferably includes a flat surface which mates with the top surface of the lower section 18b. The top section 18a preferably includes a plurality of apertures or ports which are used to connect the accessory component modules as described in more detail below. The top section 18a and the bottom section 18b of the distribution manifold 18 are sealed together to form the manifold platform 18. The two sections 18a and 18b may be sealed together by ultrasonic welding techniques known in the art or by mechanically fastening the two sections together in a manner also known in the art.

The top section 18a and bottom section 18b of the platform 18 preferably include a first aperture 26 through which a post which extends from the prefilter cartridge 16 passes. The aperture 26 (26a and 26b) and prefilter cartridge post 72 (FIG. 6) are used to fasten or affix the prefilter cartridge 16 to the distribution manifold 18.

Figure 7:
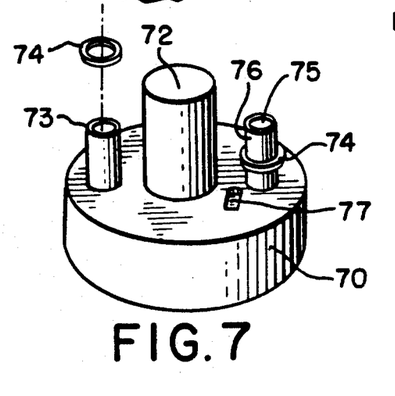
FIG. 7 is a first embodiment of a sump head which may be used in the treatment cartridges of the present invention using 0-rings to seal the treatment cartridges to the manifold.
Figure 8:
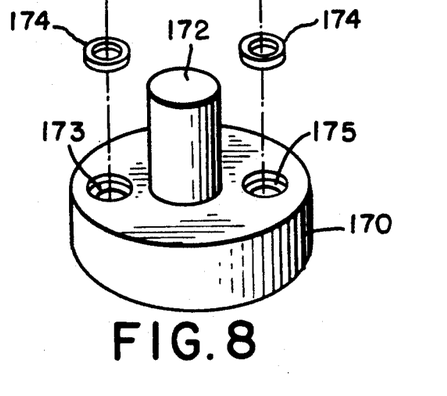
FIG. 8 is a second embodiment of a sump head which may be used in the treatment cartridges of the present invention using flat washers to seal the treatment cartridges to the manifold.

The feedwater tube 20b attached to the feedwater source is connected, in a manner described in more detail below, such that it communicates with a port 54a formed in the surface of section 18a of distribution manifold 18. An internal conduit 32 forms a fluid conduit which channels the fluid between ports 54 (54a, 54b) and 39. Port 54 is formed on the surface of the distribution manifold section 18a and defines an inlet port for the feedwater. The port 39 is formed on the surface of the distribution manifold section 186 and defines an outlet port from the internal channel 32 formed in the bottom section 18b of the distribution manifold 18. The prefilter cartridge 16 includes an inlet port formed in its sump head. The sump head inlet port aligns with the outlet port 39 in the distribution manifold 18 (the sump head portion of the filter cartridges is illustrated in FIGS. 7 and 8 and described in more detail below). Another internal conduit 36 is connected between an inlet port 41 (which communicates with an outlet port in the sump head of the prefilter 16) and an outlet port 43 (which communicates with an inlet port of the reverse osmosis cartridge 14). The second cartridge 14 also includes an outlet port which communicates with an inlet port 49 formed in the bottom section 186 of the distribution manifold. An inlet port 46b defines an inlet port for another internal channel 34. The internal channel ends at outlet port 62b which communicates, by means of the multiport connector 60, with an external tube for the reject fluid.

A port 49 defines an inlet port which corresponds to the outlet port of the reverse osmosis filter cartridge 14. An internal channel 42 communicates with another internal channel 44 which in turn leads to an inlet/outlet port 58b. The port 58b aligns with a port in the external component tubing manifold 60 which communicates with a storage tank (not shown).

The internal channel 44 includes a branch channel 45 which terminates at outlet port 53, which aligns with an inlet port in the postfilter 12. The postfilter 12 includes an outlet port which communicates and is aligned with inlet port 55 in the distribution manifold section 18b. An internal conduit 46 channels fluid from the inlet port 55 to the outlet port 56 which communicates to the faucet tube. Ports 48b and 46b are aligned with ports in the flow pressure control module 40.

The flow control module 40 includes means 38 for controlling the flow from the reverse osmosis module 14 to the rejection port 62. A port 52 aligns with a corresponding port in the flow pressure control module 40. A check valve 21 controls the flow to the conduit 44 which controls the fluid flow to the postfilter 12 and to the external component tubing to the storage tank. Apertures 22 (22a and 22b), 24 (24a, 24b) and 26 (26a and 26b) are provided in the platform module 18 for receiving the post from the various filter modules.

Figure 3:
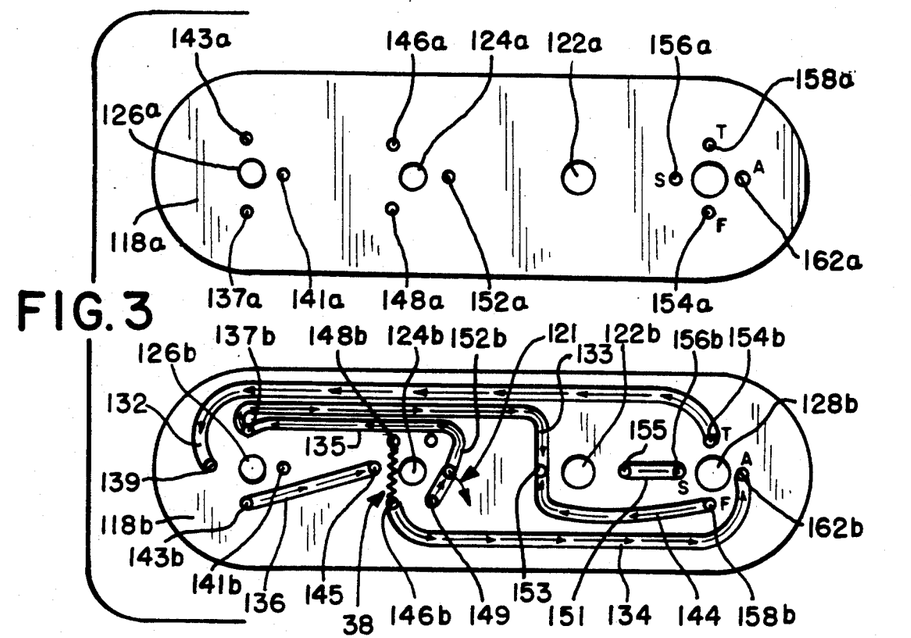
FIG. 3 is a schematic laid open view of a second preferred embodiment of the three-head distribution manifold illustrated in FIG. 1 for use with an automatic shutoff device.

FIG. 3 illustrates a second embodiment of a three-head distribution manifold design which may be used with an automatic shutoff device. The distributor manifold 118 includes a port 143a which functions as a shutoff valve outlet to the reverse osmosis membrane cartridge 114. The distribution manifold 118 includes a port 141 (141a, 141b) which communicates with the shutoff valve inlet from the prefilter. A port 137 communicates with an aligning port in the shutoff valve module 30. The other internal conduits are connected in a manner similar to the conduits in the embodiment described above with respect to FIG. 2 and therefore no further details are given here.

Figure 4:
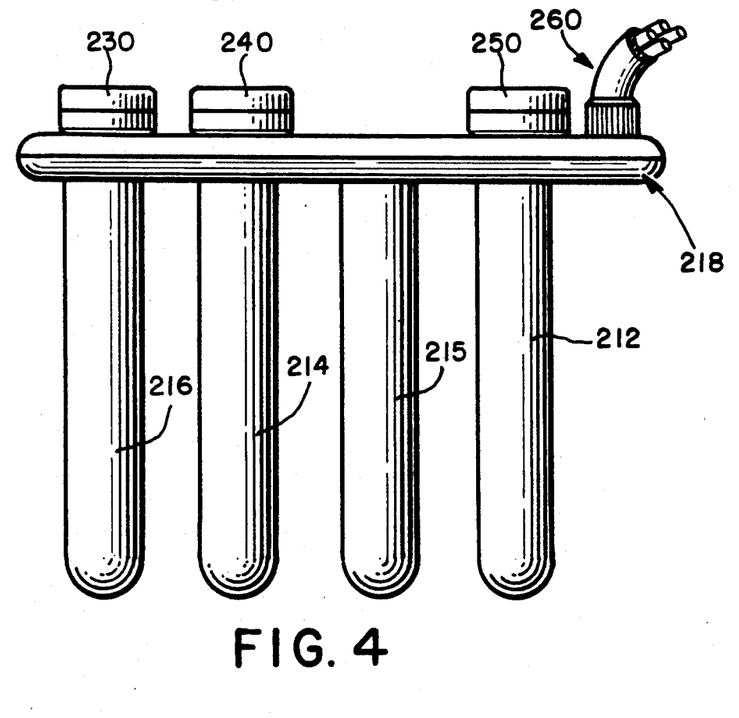
FIG. 4 illustrates another preferred embodiment of the water treatment system of the present invention with a four-head distribution manifold.

FIG. 4 illustrates another embodiment of the water treatment system of the present invention which includes a four-head distribution manifold 210. Similar to the embodiment shown in FIG. 1, the water treatment system includes a prefilter cartridge 216, a reverse osmosis membrane cartridge 214, and a postfilter cartridge 212. However in this embodiment, a separate cartridge 215 is included which incorporates a carbon filter. The carbon filter cartridge 215 is connected in series with the other cartridges between the reverse osmosis cartridge 214 and the postfilter cartridge 212.

This embodiment optionally includes a shutoff valve module 230, a flow pressure control module 240, and a rejection monitor and/or a specialized filter module 250. An external component tubing multiport connector 260 connects the external tubes 20a-20d from the external water treatment components to the distribution manifold 218.

Figure 5:
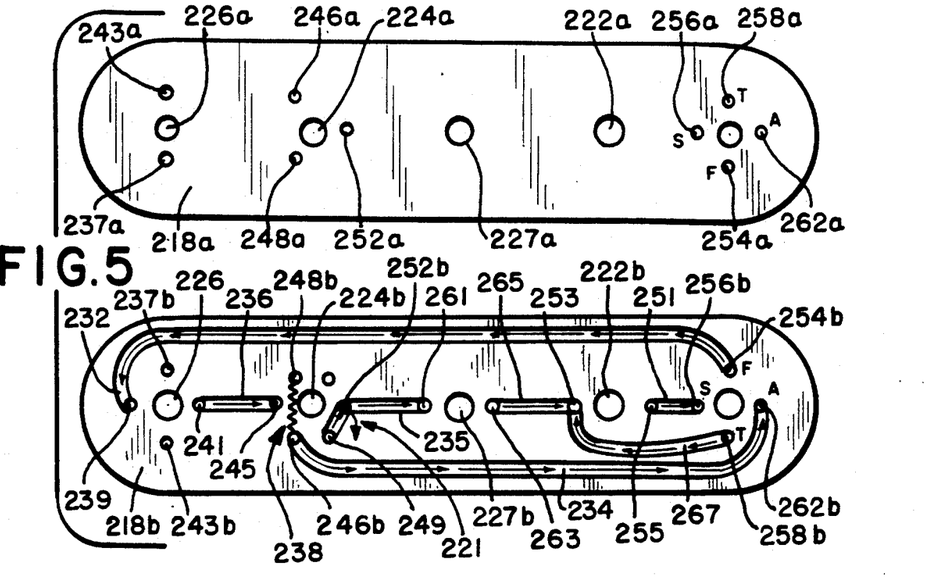
FIG. 5 is a schematic laid open view of one preferred embodiment of the platform manifold of the four-head platform manifold illustrated in FIG. 4.

Referring now specifically to FIG. 5, a laid-open view of the internal structure of a preferred embodiment of the four-head distribution manifold 210 is illustrated. The bottom section 218b of the distribution manifold 218 includes an internal conduit 232 which channels the feedwater through an inlet port 254 to the prefilter cartridge 216 through an outlet port 239. The fluid enters the distribution manifold 218 from the prefilter cartridge 216 through an inlet port 241. An internal conduit channels the fluid from the inlet port 241 to an outlet port 245 which aligns with an inlet port in the reverse osmosis filter cartridge 214. The flow control module 240 controls the flow between ports 248b and 246b which are aligned with corresponding ports in the flow control module 240. A control means 238 controls the flow between the reverse osmosis filter cartridge 214 and the rejection port 262b.

A check valve 221 controls the flow from the reverse osmosis outlet port (which aligns with the inlet port 249 in the distribution manifold 218) to the internal conduit 235 (which communicates with the carbon filter 215) by means of outlet port 261. From the carbon filter cartridge 215, the fluid to be treated enters back into the distribution manifold 218 through a port 263 to an internal channel 265. The fluid is channeled through the internal channel 265 to an outlet port 253 which communicates with the postfilter cartridge 212. The port 253 also communicates with an internal conduit 267 which in turn communicates with the external component tubing multiport connector 260. An inlet port 255 communicates with an aligning port in the postfilter 212 to provide an outlet for the flow of fluid from the postfilter 212 to the spigot through an internal conduit 251. Apertures 226, 224, 227, 222 are provided for receiving the post formed in each of the various filter cartridges.

Ports 231 and 243 may also be provided in the distribution manifold 218 which may be used to incorporate an automatic shutoff valve module. The internal conduits for the automatic shutoff valve in this embodiment may be arranged in a manner similar to the shutoff valve conduits in the embodiment illustrated in FIG. 3.

Figure 6:
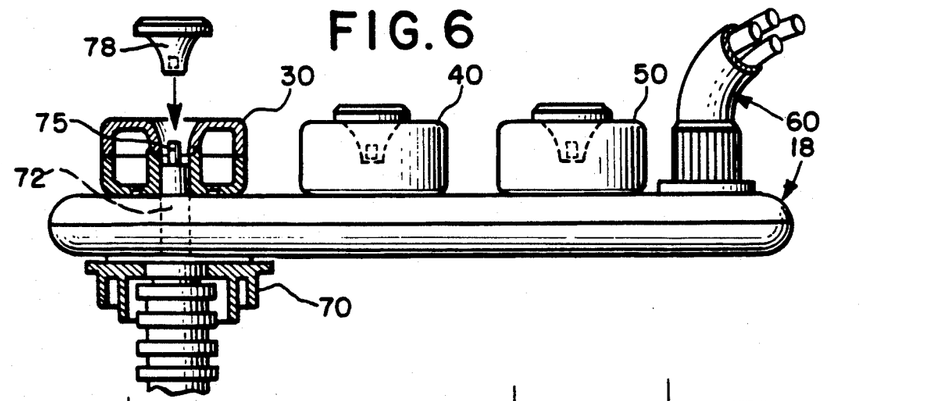
FIG. 6 illustrates a preferred embodiment of the three-head platform illustrated in FIG. 1 including a cross-sectional view of one of the treatment cartridges and accessory modules.

Referring now specifically to FIG. 6, a preferred embodiment of means for attaching the various filter cartridges and the various accessory modules to the distribution manifold 18 is illustrated. The sump head 70 includes a post 72 which is received in the aperture 26 in the distribution manifold 18. The shut-off valve module 30 also includes an aperture or cavity which fits over or receives the post 72.

As described above and illustrated in the Figure, the distribution manifold 18 includes inlet and outlet ports which align with corresponding outlet and inlet ports in the module 30. Similarly, the sump head 70 aligned such that the corresponding ports in the distribution manifold 18 are aligned with corresponding ports in the sump head 70.

In the preferred embodiment illustrated, means are provided for affixing or securing the module 30 to the distribution manifold 18. The preferred embodiment illustrated includes a lock-in-place cap 78 which cooperates with a narrowed section 75 on the post 72 to lock the module 30 and filter cartridge 16 to the distribution manifold 18.

As will be recognized by those skilled in the art, other means for locking the filter cartridges and accessory modules to the distribution manifold 18 are also possible. For example, the cartridges and modules may be secured to the distribution manifold 18 by bolts formed as part of the post 72 which are fastened to the distribution manifold 18 by means of hand nuts (not shown).

Preferably, means are provided for aligning the cartridges and/or modules such as that the predetermined ports in the various cartridges and/or modules align with the respective ports in the distribution manifold 18. The aligning means may include pins which extend from the top of the sump head 70 and which fit into recesses in the manifold 18 to align the cartridges and/or modules. Other suitable aligning means may also be provided.

Further, it may also be desirable to provide indexing or coding means to assure that a particular cartridge is installed only in its corresponding location. The indexing means may comprise, for example, means for coding the various cartridges such as notches and aligning tabs or pins and aligning apertures.

Referring now to FIGS. 7 and 8, two preferred embodiments for a sump head which forms part of the various cartridges of the filter assembly are illustrated. FIG. 7 illustrates a first embodiment wherein the sump head includes two posts 76 which include ports 73 and 75. The sump head ports 73 and 75 align with corresponding ports 39 and 41 in the distribution manifold 18. A pair of 0-rings 74 are provided as sealing means for the corresponding ports. An aligning or indexing means such as post 77 is also provided in the sump head.

FIG. 8 illustrates a second embodiment wherein ports 173 and 175, formed in the sump head 170, align with corresponding ports 39 and 41 in the distribution manifold 18. The sealing means used in this embodiment includes two flat washers 174. A similar arrangement is used for each of the various cartridges of the fluid treatment system.

Figure 9:
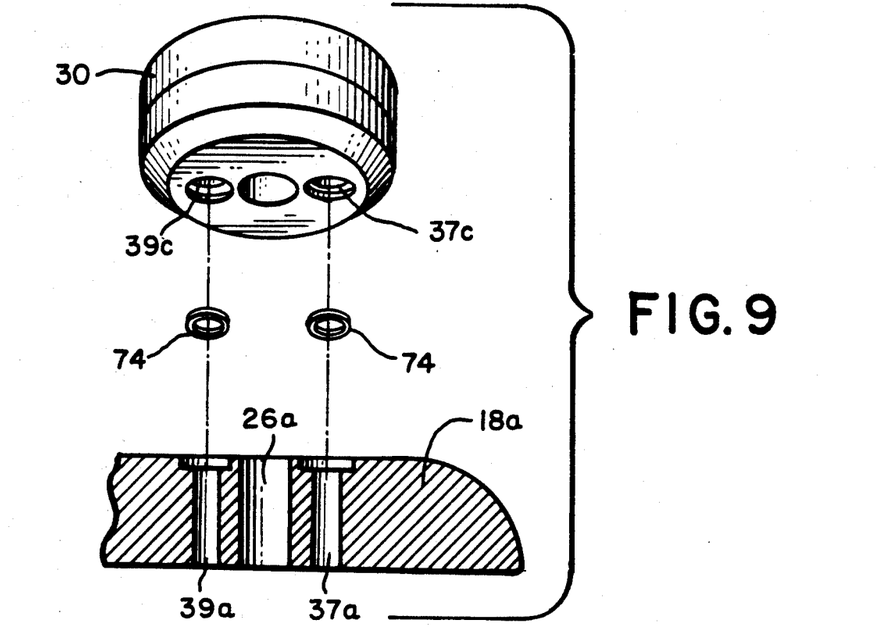
FIG. 9 illustrates an exploded view of an accessory module which may be attached to the distribution manifold of the present invention using the flat washer arrangement of FIG. 8.

FIG. 9 illustrates preferred means for attaching the various accessory modules to the distribution manifold. For purposes of clarity, only the first module 30 is shown in cross section. It will be readily apparent to those skilled in the art that the other accessory component modules may be attached in a similar fashion. As illustrated, the section 18a top of the distribution manifold 18 includes the aperture 26a and ports 39a and 37a which align with corresponding ports 39c and 37a, respectively, in the module 30. Flat washers 74 are provided in recesses in the distribution manifold section 18a. The flat washers provide a seal between the ports in module 30 and the top section 18a of the distribution manifold 18. It will be recognized that other sealing means, such as O-rings, may also be used.

Figure 10:
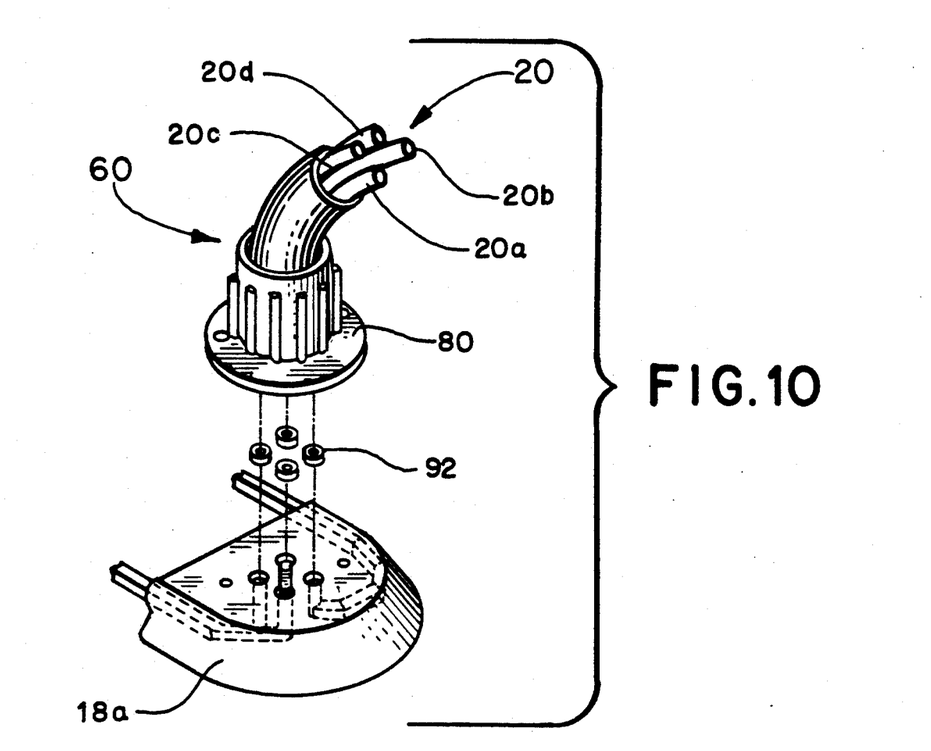
FIG. 10 illustrates a preferred embodiment of the multiport connector of the present invention.
Figure 11:
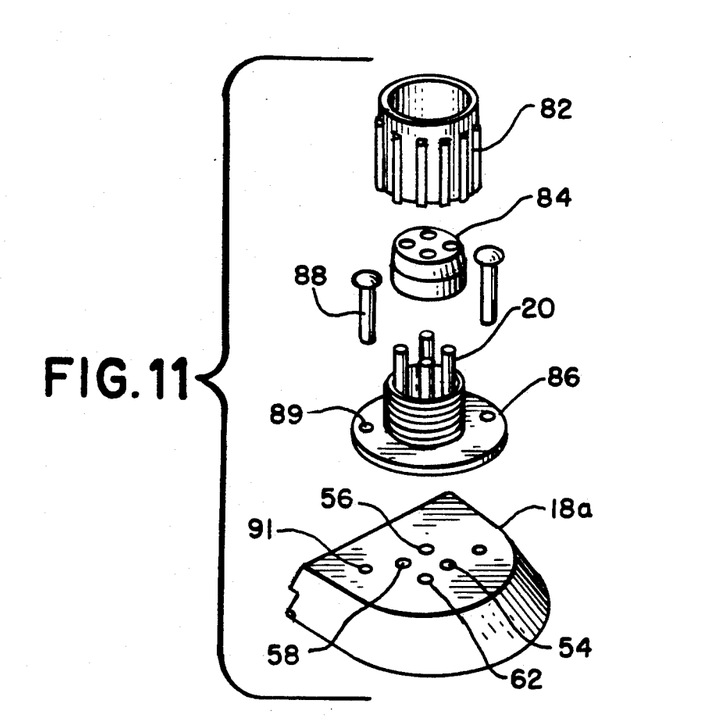
FIG. 11 illustrates an exploded view of the external tubing fitting illustrated in FIG. 10.

Referring now specifically to FIGS. 10 and 11, a preferred embodiment of the multiport connector 60, for attaching the plurality of external component tubes to the top of the distribution manifold section 18a, is illustrated. The external component tubes may be, for example, a tube 20a connected to the rejection port channel, a second tube 20b connected to the feedwater source, a third tube 20c connected to the storage tank, and a fourth tube 20d connected the faucet.

The multiport connector 60 includes a collar 82, a collet 84 and a connector member 86 which includes a plurality of extending tube connection members 20. The connector member 86 also includes a plurality of ports which align with the ports 62, 54, 56, and 91 in the top section 18a of the distribution manifold 18. The collar 82 includes internal threads which cooperate with external threads on the connector member 86. Mounting fasteners 88 pass through holes 89 and 91 in the connector member 86 and distribution manifold section 18a to fasten the multiport connector 60 to the distribution manifold 18.

Figure 12:
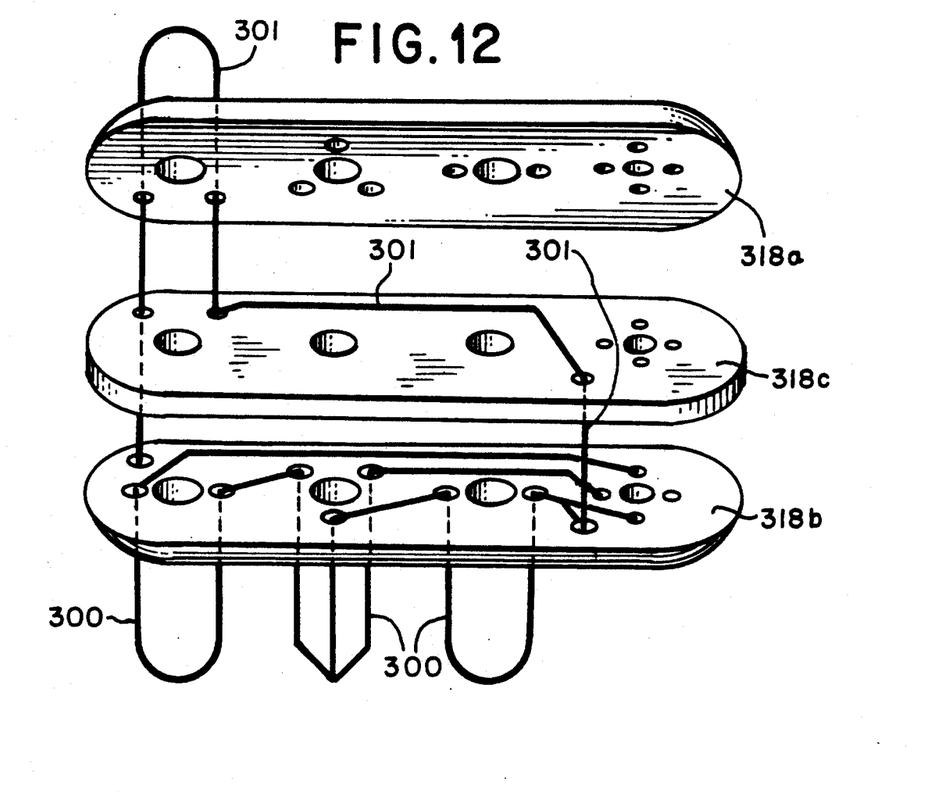
FIG. 12 illustrates another embodiment of the distribution manifold of the present invention including an extension section to provide a multilayer arrangement which may be used for cross channeling.

FIG. 12 illustrates yet another preferred embodiment of the present invention wherein a third manifold section is added to the distribution manifold. The additional manifold section platform changes the flow of the fluid being treated through the distribution manifold 318. The distribution manifold includes a top section 318a, a middle section 318c and a bottom section 318b. The flow path which is provided by adding the middle section 318c is illustrated by the combination of solid and broken lines labelled as 301, while the flow path without the middle section 318c is illustrated by the combination of solid and broken lines labelled as 300. As illustrated, the addition of this middle section 381c provides an extended flow path which is three dimensional and may be used for cross channeling. Therefore, with this embodiment, the same top and bottom sections 318a and 318b can be used for various designs with the addition of the middle section 318c. By adding the middle section (or other additional sections) to the manifold, a more complex flow path including channels which cross over each other is provided.

Although the distribution manifold has been illustrated as having an oval shape in the drawings, it will be recognized by those skilled in the art that other shapes, such as rectangular, square, round or other suitable shapes may also be used. The different shapes may be useful where it is desirable to differentiate distribution manifolds used for various purposes. For example, one shape may be used for countertop application and a second shape may be used for under-the-counter applications.

The filter cartridges may be constructed of plastic or other similar materials which can hold the liquid under purification conditions. Preferably, the cartridges are made by molding a plastic or polymer resin into halves which are fused together in a manner known in the art to secure appropriate purification systems within. The distribution manifold is preferably made of a similar material capable of withstanding purification conditions and is also preferably made by molding. The nuts, bolts and screws employed may be any common fasteners known in the art. The modules, manifold and fasteners are preferably constructed of materials such as plastics or polymer resins to increase their resistance to corrosion and rust while providing strength and light weight.

Therefore the fluid treatment system of the present invention provides several advantages over prior art designs. The need to use brass fittings is eliminated without the leaking problems of prior art designs. The tubing for external devices may be easily attached to the single external multiport connector which is also easily attached to the distribution manifold. The manner in which the individual treatment cartridges or modules are fastened avoids the problem of the cumulative tolerances present in prior art designs which use cartridges. The tolerances of each individual head are independent of each of the tolerances of the other heads with the present invention. The cartridges are easily installed and removed from the distribution platform manifold and the tubing is connected in a much more aesthetic manner than prior art designs. Additional components may be easily installed to the system in a more aesthetic manner than presently available systems. The distribution platform manifold of the present invention may be easily made by known techniques, such as by molding. No secondary processes are necessary to manufacture the manifold of the present invention thus making manufacturing of the system less expensive. Available manufacturing processes, such as injection molding can be used to manufacture the upper and lower halves of the manifold and processes such as ultrasonic welding can be used to join the upper and lower halves of the manifold. Moreover, since the cartridges attach by means of a post which extends through the manifold and a locking mechanism affixed to the post, the system has a greater overall structural strength. That is, the post and locking mechanism help bind the manifold parts together. This design is superior to existing designs for attaching cartridges to a manifold which tend to force the components attached to the manifold apart.

The foregoing description of the preferred embodiments of the present invention has been presented for purposes of illustration and description. They are not intended to be exhaustive or to limit the invention to the precise forms disclosed, and obviously many modifications and variations are possible in light of the above teachings. The embodiments were chosen and described in order to best explain the principles of the invention and its practical applications. It is intended that the scope of the invention be defined by the following claims, including all equivalents.

We claim:

1. A fluid treatment apparatus for connection to a plurality of external components through a plurality of external component fluid connection tubes, including a tube connected to feed source and a tube connected to a faucet, said apparatus, requiring no fittings, or tubing for interconnecting the components parts, comprising:

a fluid distribution manifold including a plurality of internal fluid channels, one end of each of the fluid channels terminating at a first channel port in the outer surface of the distribution manifold and the other end of each of the fluid channels terminating at a second channel port in the surface of the distribution manifold, said manifold being composed of at least two sections, at least one of said sections having grooves at the interface thereof such that adjoining sections sealed together define said internal fluid channels;

a multiport connector including a plurality of fluid channels, each multiport connector fluid channel including a first port for connecting to one of the external component fluid connection tubes and a second port for connection to the distribution manifold, the multiport connector configured such that a predetermined one of the second ports in the multiport connector aligns with a predetermined one of the first channel ports in the distribution manifold;

means for attaching the external component fluid connection tubes to the multiport connector; and at least one fluid treatment cartridge, the treatment cartridge including a sump, the sump including at least one fluid inlet port and at least one fluid outlet port, the sump configured such that the at least one fluid inlet port aligns with a predetermined one of the second channel ports in the distribution manifold and the at least one outlet port aligns with another predetermined one of the second channel ports in the distribution manifold, said manifold eliminating the need for fittings and for tubing interconnecting the component parts and providing for easy replacement of said cartridge.

2. The fluid treatment apparatus of claim 1 including a plurality of treatment cartridges wherein the internal manifold channels are configured such that the treatment cartridges are connected in series.

3. The fluid treatment apparatus of claim 2 wherein the fluid treatment cartridges include a prefilter, a reverse osmosis treatment cartridge, and a postfilter, wherein the internal channels of the distribution manifold are configures such that the feed source tube feeds the fluid to be treated first to the prefilter and such that the spigot tube is connected to the postfilter.

4. The fluid treatment apparatus of claim 3 further comprising a carbon filter cartridge, wherein the distribution manifold includes internal channels connecting the carbon filter in series between the reverse osmosis treatment cartridge and the postfilter.

5. The fluid treatment apparatus of claim 1 further comprising at least one accessory device having at least one inlet port and at least one outlet port, wherein the distribution manifold is configured such that the at least one accessory device inlet port aligns with a predetermined one of the second ports in the distribution manifold and such that the at least one accessory device outlet port aligns with a predetermined one of the second ports in the distribution manifold.

6. The fluid treatment apparatus of claim 5 wherein the fluid treatment apparatus comprises a plurality of accessory modules.

7. The fluid treatment apparatus of claim 6 wherein the accessory modules comprise fluid control devices and fluid monitoring devices.

8. The fluid treatment apparatus of claim 1 further including means for aligning the ports in the treatment cartridge with the respective ports in the distribution manifold.

9. The fluid treatment apparatus of claim 8 wherein the aligning means comprises a pin extending from the surface of the cartridge and a recess in the distribution manifold adapted to receive the pin.

10. The fluid treatment apparatus of claim 1 wherein the distribution manifold includes a cartridge receiving aperture and wherein the treatment cartridge includes a port adapted to be received in the cartridge receiving aperture, the post comprising means for affixing the treatment cartridge to the distribution manifold.

11. A fluid treatment apparatus for connection to a plurality of external components through a plurality of fluid connection tubes, including a connection tube connected to feed source and a connection tube connected to a spigot, the fluid treatment device comprising:

a fluid distribution manifold including a plurality of internal fluid channels, one each of each of the fluid channels terminating at a first channel port in the outer surface of the distribution manifold and the other end of each of the fluid channels terminating at a second channel port in the surface of the distribution manifold, said manifold being composed of at least two sections, at least one of said sections having grooves at the interface thereof such that adjoining sections sealed together define said internal fluid channels;

a multiport connector including a plurality of fluid channels, each multiport connector fluid channel including a first port for connecting to one of the external component fluid connection tubes and a second port for connection to the distribution manifold, the multiport connector configures such that predetermined one of the second ports in the multiport connector aligns with a predetermined one of the first channel ports in the distribution manifold;

means for attaching the external component fluid connection tubes to the multiport connector; and a plurality of discrete fluid treatment cartridges, each fluid treatment cartridge including a sump, the sump of each cartridge including at least one fluid inlet port and at least one fluid outlet port, the sump configured such that the at least one fluid inlet port aligns with a predetermined one of the second channel ports in the distribution manifold and the at least one outlet port aligns with a predetermined one of the second channel ports in the distribution manifold said manifold eliminating the need for fittings and tubing connecting the component parts and providing for easy replacement of said cartridges.

12. The fluid treatment apparatus of claim 11 wherein the distribution manifold includes a plurality of cartridge receiving apertures, one for each treatment cartridge, and wherein each of the treatment cartridges includes a post adapted to be received in one of the cartridge receiving apertures, each of the posts comprising means for affixing the respective treatment cartridge to the distribution manifold.

13. The fluid treatment apparatus of claim 11 wherein the internal manifold channels are configured such that the treatment cartridges are connected in series.

14. The fluid treatment apparatus of claim 13 wherein the fluid treatment cartridges include a prefilter, a reverse osmosis treatment cartridge, and a postfilter, wherein the internal channels of the distribution manifold are configures such that the feed tube feeds the fluid to be processed first to the prefilter and such that the spigot tube is connected to the postfilter.

15. The fluid treatment apparatus of claim 14 further comprising a carbon filter cartridge, wherein the distribution manifold includes internal channels connecting the carbon filter in series between the reverse osmosis treatment cartridge and the postfilter.

16. The fluid treatment apparatus and claim 11 further comprising at least one accessory device having at least one inlet port and at least one outlet port, wherein the distribution manifold is configured such that the at least one accessory device inlet port aligns with a predetermined one of the second ports in the distribution manifold and such that the at least one accessory device outlet port aligns with a predetermined one of the second ports in the distribution manifold.

17. The fluid treatment apparatus of claim 16 wherein the fluid treatment apparatus comprises a plurality of accessory modules.

18. The fluid treatment apparatus of claim 17 wherein the accessory modules comprise fluid control device and fluid monitoring devices.

19. The fluid treatment apparatus of claim 11 further including means for aligning the ports in the treatment cartridge with the respective ports in the distribution manifold.

20. The fluid treatment apparatus of claim 19 wherein the aligning means comprises a pin extending from the surface of the cartridge and a recess in the distribution manifold adapted to receive the pin.

21. A fluid treatment apparatus for connection to a plurality of external components through a plurality of external component fluid connection tubes, including a tube connected to feed source and a tube connected to a spigot, the fluid treatment device comprising:

a fluid distribution manifold including a plurality of internal fluid channels, one end of each of the fluid channels terminating at a first channel port in the outer surface of the distribution manifold and the other end of each of the fluid channels terminating at a second channel port in the surface of the distribution manifold, the distribution manifold further including a plurality of cartridge receiving apertures, said manifold being composed of at least two sections, at least one of said sections having grooves at the interface thereof such that adjoining sections sealed together define said internal fluid channels;

a multiport connector including a plurality of fluid channels, each multiport connector fluid channel including a first port for connecting to one of the external component fluid connection tubes and a second port for connection to the distribution manifold, the multiport connector configured such that a predetermined one of the second ports in the multiport connector aligns with a predetermined one of the first channel ports in the distribution manifold;

means for attaching the external component fluid connection tubes to the multiport connector; and a plurality of discrete fluid treatment cartridges, each fluid treatment cartridge including a sump, the sump of each cartridge including at least one fluid inlet port and at least one fluid outlet port, the sump configured such that the at least one fluid inlet port aligns with a predetermined one of the second channel ports in the distribution manifold and the at least one outlet port aligns with a predetermined one of the second channel ports in the distribution manifold, each of the treatment cartridges including a post adapted to be received in one of the cartridge receiving apertures, each of the posts comprising means for affixing the respective treatment cartridge to the distribution manifold, said manifold eliminating the need for fittings and tubing for connecting the cartridges and allowing easy replacement of said cartridges.

22. The fluid treatment apparatus of claim 21 further comprising at least one accessory device having at least one inlet port and at least one outlet port, wherein the distribution manifold is configured such that the at least one accessory device inlet port aligns with a predetermined one of the second ports in the distribution manifold and such that the at least one accessory device outlet port aligns with a predetermined one of the second ports in the distribution manifold.

23. The fluid treatment apparatus of claim 22 wherein the fluid treatment apparatus comprises a plurality of accessory modules.

24. The fluid treatment apparatus of claim 23 wherein the accessory modules comprise fluid control device and fluid monitoring devices.

25. The fluid treatment apparatus of claim 21 further including means for aligning the ports in the treatment cartridge with the respective ports in the distribution manifold.

26. The fluid treatment apparatus of claim 25 wherein the aligning means comprises a pin attached to the surface of the cartridge and a recess in the distribution manifold adapted to receive the pin.

* * * * *